US008994910B2

(12) United States Patent
Rho et al.

(10) Patent No.: US 8,994,910 B2
(45) Date of Patent: Mar. 31, 2015

(54) DISPLAY PANEL AND METHOD OF MANUFACTURING THE DISPLAY PANEL

(75) Inventors: Soon-Joon Rho, Suwon-si (KR); Hyeok-Jin Lee, Seongnam-si (KR); Ji-Hong Bae, Yongin-si (KR); Jun-Ha Park, Anyang-si (KR); Hye-Lim Jang, Yongin-si (KR); Tae-Hoon Yoon, Busan (KR); Dong-Han Song, Busan (KR); Ki-Han Kim, Changwon-si (KR); Jung-Wook Kim, Busan (KR)

(73) Assignees: Samsung Display Co., Ltd., Yongin (KR); Institute for Research & Industry Cooperation, PNU, Busan (KR)

( * ) Notice: Subject to any disclaimer, the term of this patent is extended or adjusted under 35 U.S.C. 154(b) by 354 days.

(21) Appl. No.: 13/524,507

(22) Filed: Jun. 15, 2012

(65) Prior Publication Data

US 2013/0077038 A1 Mar. 28, 2013

(30) Foreign Application Priority Data

Sep. 23, 2011 (KR) ........................ 10-2011-0095999

(51) Int. Cl.
  *G02F 1/1337* (2006.01)
  *G02F 1/1343* (2006.01)
  *C09K 19/52* (2006.01)
  *B82Y 20/00* (2011.01)
  *C09K 19/04* (2006.01)

(52) U.S. Cl.
  CPC ................. *C09K 19/52* (2013.01); *B82Y 20/00* (2013.01); *G02F 1/1343* (2013.01); *C09K 2019/0448* (2013.01); *C09K 2019/528* (2013.01); *G02F 2001/134381* (2013.01)
  USPC ........... 349/166; 349/139; 349/141; 349/182; 349/191

(58) Field of Classification Search
  CPC .................. B82Y 20/00; C09K 19/52; C09K 2019/0448; C09K 2019/528; G02F 2001/134381; G02F 1/143
  USPC ................ 349/139, 141, 166, 182, 187, 191; 252/299.01, 299.5; 445/24; 977/700, 977/742, 952
  See application file for complete search history.

(56) References Cited

U.S. PATENT DOCUMENTS

| 7,316,789 | B2 * | 1/2008 | Lu ............................. 252/299.01 |
| 2008/0278675 | A1 * | 11/2008 | Escuti et al. .................. 349/201 |
| 2011/0096259 | A1 * | 4/2011 | Lee et al. ......................... 349/41 |
| 2011/0122362 | A1 * | 5/2011 | Galstian ........................ 349/191 |
| 2011/0222010 | A1 * | 9/2011 | Lee et al. ....................... 349/139 |
| 2012/0162590 | A1 * | 6/2012 | Kim et al. ...................... 349/127 |

* cited by examiner

*Primary Examiner* — Dung Nguyen
*Assistant Examiner* — Tai Duong
(74) *Attorney, Agent, or Firm* — H.C. Park & Associates, PLC

(57) ABSTRACT

In a display panel and a method of manufacturing the display panel, the display panel includes a display substrate including a first electrode and a second electrode insulated from the first electrode and disposed on the first electrode, an opposite substrate including a third electrode facing the second electrode, and a liquid crystal layer interposed between the display substrate and the opposite substrate. The liquid crystal layer includes liquid crystal molecules, a reactive mesogen polymer, and nano-rods.

19 Claims, 6 Drawing Sheets

DISPLAY PANEL AND METHOD OF MANUFACTURING THE DISPLAY PANEL

CROSS REFERENCE TO RELATED APPLICATION

This application claims priority from and the benefit of Korean Patent Application No. 2011-0095999, filed on Sep. 23, 2011, which is hereby incorporated by reference for all purposes as if fully set forth herein.

BACKGROUND OF THE INVENTION

1. Field of the Invention

Exemplary embodiments of the present invention relate to a display panel and a method of manufacturing the display panel. Exemplary embodiments of the present invention relate to a display panel used for a liquid crystal display apparatus and a method of manufacturing the display panel.

2. Discussion of the Background

Generally, a display panel includes a display substrate including a switching element for driving a pixel, an opposite substrate facing the display substrate, and a liquid crystal layer interposed between the display substrate and the opposite substrate. When an electric field is formed in the liquid crystal layer, an alignment of liquid crystal molecules in the liquid crystal layer changes to control a transmittance of light so that the display panel may display an image.

Since a typical liquid crystal display ("LCD") panel is driven by a driving method of a hold type, a video characteristic may be poor compared to a traditional cathode-ray tube ("CRT") display device. In addition, a response speed may be low so that a display quality of a 3-dimensional ("3D") image may be difficult to be improved. In particular, when a response speed of a liquid crystal is low, a brightness of the 3D image displayed by an active-shutter type display may be decreased and a crosstalk may be increased.

The LCD panel may have a display mode using a horizontal electric field such as an In-Plane Switching ("IPS") mode, a Fringe Field Switching ("FFS") mode, etc., or a display mode using a vertical electric field such as a Patterned Vertically Alignment ("PVA") mode, a Polymer Stabilized Vertically Alignment ("PSVA") mode, etc.

In a display mode using both the horizontal electric field and the vertical electric field, a turn-on response speed relating to a rising time ($T_{on}$) of the liquid crystal may be controlled by an electric field effect and liquid crystal properties, and a turn-off response speed relating to a falling time ($T_{off}$) of the liquid crystal may be merely controlled by the liquid crystal properties. Therefore, improving the turn-off response speed may be achieved by decreasing a rotating viscosity ($\gamma_1$), increasing a bend modulus of elasticity ($K_{33}$), or a refractive anisotropy ($\Delta n$) of the liquid crystal.

However, the rotating viscosity, the bend modulus of elasticity, and the refractive anisotropy have traded-offs therebetween. Therefore, each of the liquid crystal properties may not be independently controlled so that it is hard to control the liquid crystal properties, and thus it is difficult to obtain a proper response speed for displaying the 3D image.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a display panel capable of improving a response speed.

Exemplary embodiments of the present invention also provide a method of s manufacturing the display panel.

Additional features of the invention will be set forth in the description which follows, and in part will be apparent from the description, or may be learned by practice of the invention.

According to an exemplary embodiment of the present invention, the display panel includes a display substrate, an opposite substrate and a liquid crystal layer. The display substrate includes a first electrode and a second electrode insulated from the first electrode and disposed on the first electrode. The opposite substrate includes a third electrode facing the second electrode. The liquid crystal layer is interposed between the display substrate and the opposite substrate, and includes liquid crystal molecules, a reactive mesogen polymer and nano-rods.

According to an exemplary embodiment of the present invention, there is provided a method of manufacturing a display panel. In the method, a display substrate including a first electrode and a second electrode insulated from and disposed on the first electrode is combined with an opposite substrate including a third electrode to face the display substrate and the opposite substrate. An electric field is provided to a liquid crystal composition interposed between the display substrate and the opposite substrate, and the liquid crystal composition includes liquid crystal molecules, reactive mesogens, and nano-rods. An ultraviolet light is irradiated to the liquid crystal composition when the electric field is formed, to form a reactive mesogen polymer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
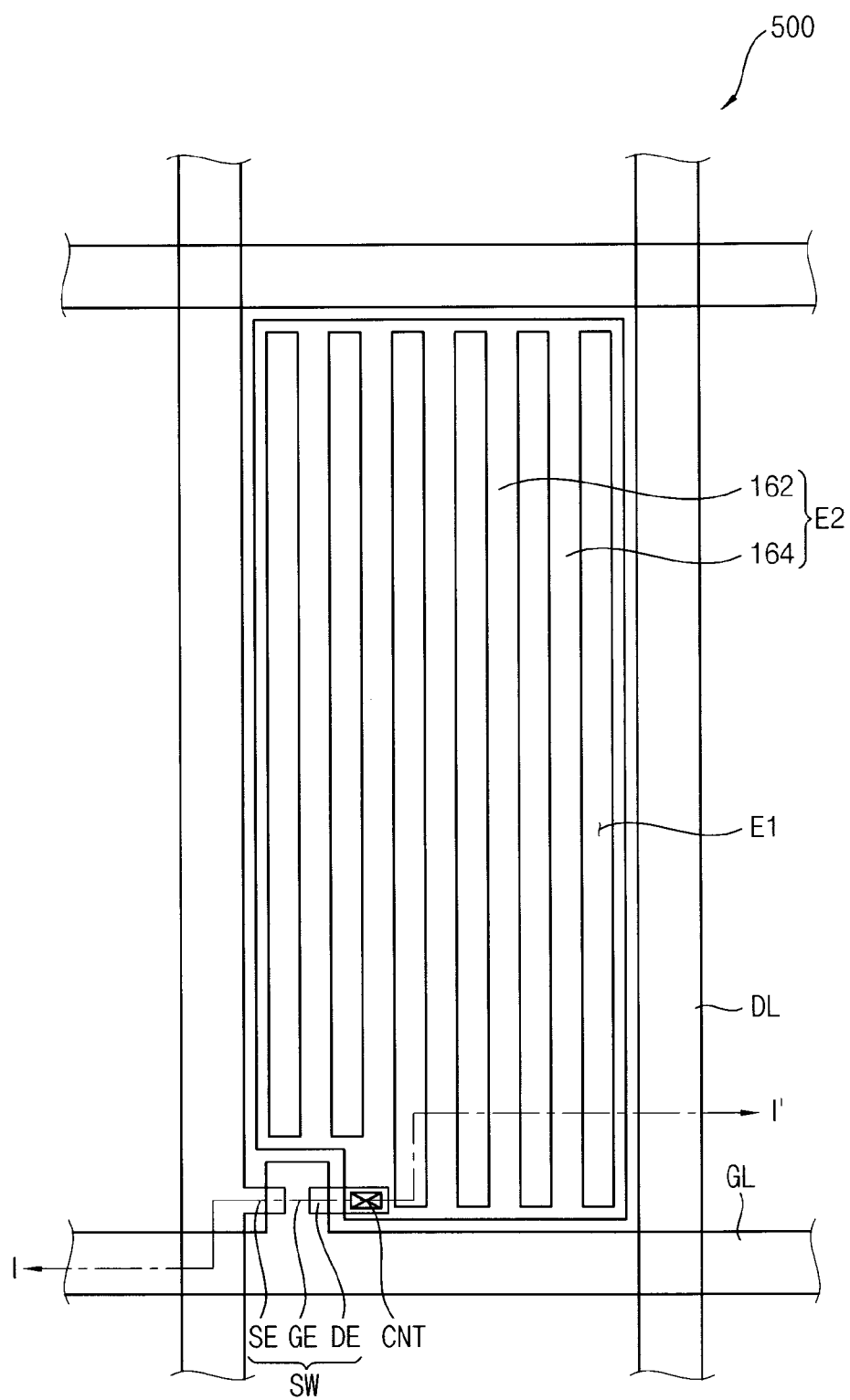
FIG. 1 is a plan view illustrating a display panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
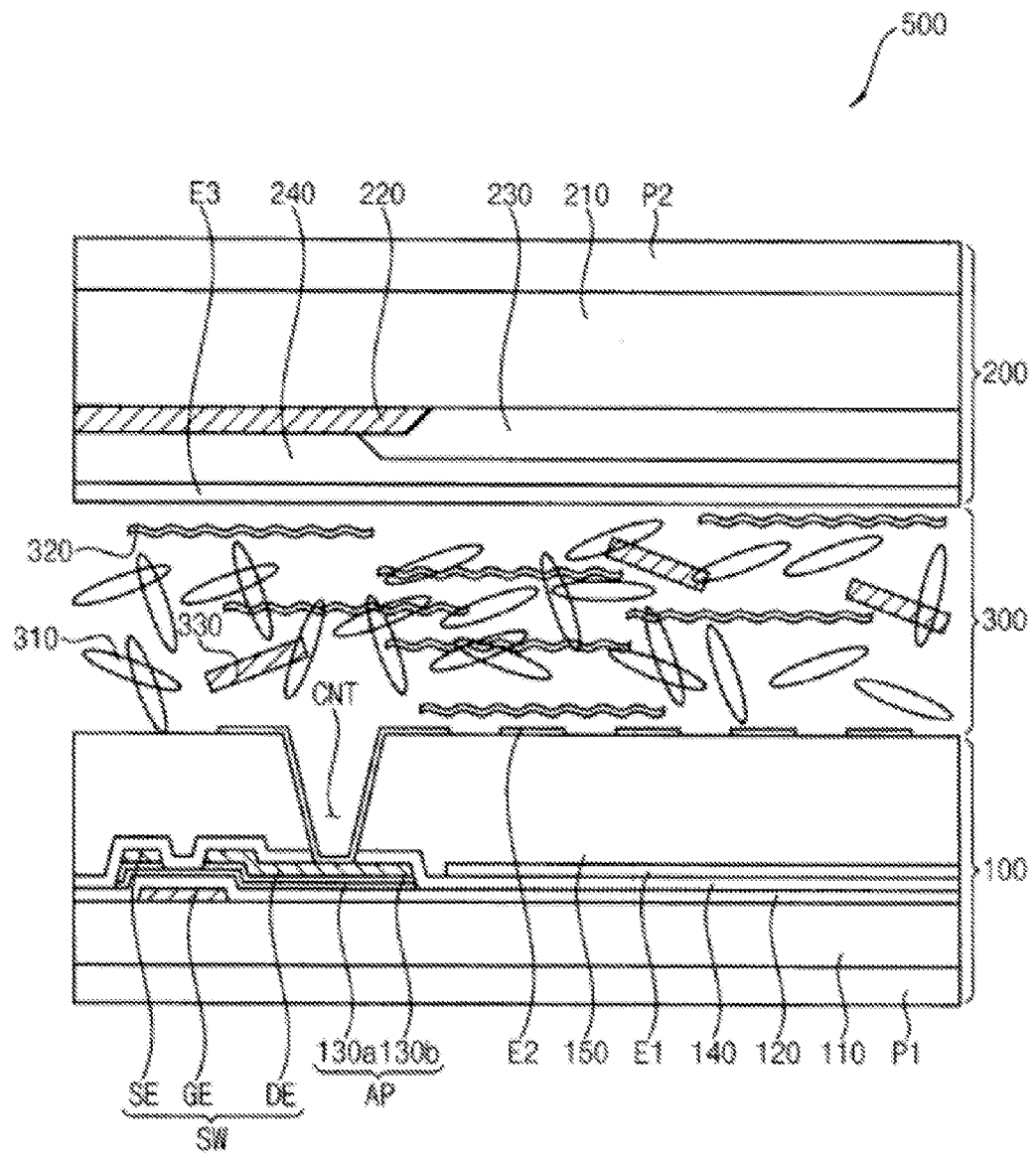
FIG. 2 is a cross-sectional view taken along line I-I' in FIG. 1 in a non-electric field state.

FIG. 1 is a plan view illustrating a display panel according to an exemplary embodiment of the present invention. FIG. 2 is a cross-sectional view taken along line I-I' in FIG. 1 in a non-electric field state.

Referring to FIG. 1 and FIG. 2, a display panel 500 includes a display substrate 100, an opposite substrate 200 and a liquid crystal ("LC") layer 300. The display panel 500 may further include a first polarizing plate P1 attached to the display substrate 100 and a second polarizing plate P2 attached to the opposite substrate 200. Each of the display substrate 100 and the opposite substrate 200 does not include additional alignment layer for controlling LC molecules 310 of the LC layer 300.

The display substrate 100 includes a gate line GL formed on a first base substrate 110, a data line DL, a thin-film transistor SW, a first electrode E1 and a second electrode E2. The display substrate 100 further includes a first insulating layer 120 insulating the gate line GL from the data line DL, a second insulating layer 140 protecting the thin-film transistor SW, and a planarization layer 150 planarizing a surface of the display substrate 100.

The gate line GL and the data line DL cross each other and the thin-film transistor SW is connected to the gate line GL and the data line DL. The thin-film transistor includes a gate electrode GE connected to the gate line GL, a source electrode SE connected to the data line DL, a drain electrode DE spaced apart from the source electrode SE, and an active pattern AP. The active pattern AP includes a semiconductor layer 130a and an ohmic contact layer 130b. The semiconductor layer 130a may include silicon or metal oxide. The ohmic contact layer 130b may be omitted.

The first electrode E1 is formed on the second insulating layer 140 covering the thin-film transistor SW. The first electrode E1 is electrically and structurally separated from the second electrode E2 and the thin-film transistor SW. The first electrode E1 may be a common electrode for a pixel. The first electrode E1 may be formed in a region of the first base substrate 110 divided by the gate line GL and the data line DL without being patterned. The first electrode E1 of one pixel may be spaced apart from an electrode formed in a pixel adjacent to the pixel in which the first electrode E1 is formed. The electrode may serve as the first electrode E1 of the adjacent pixel. Alternatively, the first electrode E1 may be entirely formed on the first base substrate 110 and include a slit pattern.

The second electrode E2 is formed on the planarization layer 150 to be insulated from the first electrode E1. The second electrode E2 makes contact with the drain electrode DE through a contact hole CNT passing through the second insulating layer 140 and the planarization layer 150. The second electrode E2 is connected to the thin-film transistor SW. The second electrode E2 may serve as a pixel electrode for the pixel. The second electrode E2 includes a contact electrode contacting with the drain electrode DE and a plurality of sub electrodes 162 and 164 connected to the contact electrode. The sub electrodes 162 and 164 may extend in an extending direction of the data line DL and may be spaced apart from each other along an extending direction of the gate line GL. Although the sub electrodes 162 and 164 are spaced along the extending direction of the gate line GL, both edge portions of the sub electrodes 162 and 164 disposed along the extending direction of the data line DL may be connected to each other. When viewed in a plan, the first electrode E1 overlaps with the sub electrodes 162 and 164 and is disposed in a region from which the sub electrodes 162 and 164 are spaced. The first electrode E1 and the second electrode E2 overlap with each other.

The first electrode E1 and the second electrode E2 receive voltages different from each other. Thus, a potential difference between the first and second electrodes E1 and E2 is generated and a horizontal electric field is formed parallel with a surface of the first base substrate 110 and between the first and second electrodes E1 and E2 by the potential difference. The horizontal electric field affect to the LC layer 300 so that it may be defined that the horizontal electric field is formed in the LC layer 300.

Different from being illustrated in FIG. 2, the first electrode E1 may make contact with the drain electrode DE to be connected to the thin-film transistor SW. The planarization layer 150 may entirely cover the thin-film transistor SW and the first electrode E1. Here, the second electrode E2 is formed on the planarization layer 150 to be insulated from the thin-film transistor SW and the first electrode E1. Then, the first electrode E1 may serve as the pixel electrode and the second electrode E2 may serve as the common electrode.

A polarizing axis of the first polarizing plate P1 may be inclined by about 45° toward the sub electrodes 162 and 164 of the second electrode E2. The polarizing axis of the first polarizing plate P1 may be disposed along a direction between the extending directions of the gate line GL and the data line DL. Although not shown in the figures, a first phase compensating film, for example, a negative C-plate may be disposed between the first polarizing plate P1 and the display substrate 100.

The opposite substrate 200 faces the display substrate 100 and includes a third electrode E3 formed on a second base substrate 210. The opposite substrate 200 may further include a light-blocking pattern 220, a color filter 230 and an over-coating layer 240.

The light-blocking pattern 220 is formed on the second base substrate 210 corresponding to the gate line GL, the data line DL and the thin-film transistor SW. The color filter 230 is formed on the second base substrate 210 corresponding to the second electrode E2. The over-coating layer 240 may planarize a surface of the opposite substrate 200.

The third electrode E3 faces the second electrode E2 and is formed on the over-coating layer 240. The third electrode E3 is entirely formed on the second base substrate 210. The third electrode E3 receives a voltage having a different level from the first electrode E1 and/or the second electrode E2 to form a vertical electric field with the first electrode E1 and/or the second electrode E2 in a direction between the display substrate 100 and the opposite substrate 200, that is, a direction perpendicular to a surface of the first base substrate 110 with respect to the surface of the first base substrate 110. The vertical electric field may be formed between the first electrode E1 and the third electrode E3 or between the second electrode E2 and the third electrode E3.

A polarizing axis of the second polarizing plate P2 may be inclined by about 45° toward the sub electrodes 162 and 164 of the second electrode E2. The polarizing axis of the second polarizing plate P2 may be perpendicular to the polarizing axis of the first polarizing plate P1. Although not shown in the figures, a second phase compensating film, for example, a negative C-plate may be disposed between the second polarizing plate P2 and the opposite substrate 200. A view angle when the vertical electric field is formed in the LC layer 300 may be improved by the first and second phase compensating films.

The LC layer 300 is interposed between the display substrate 100 and the opposite substrate 200 and includes the LC molecules 310, a reactive mesogen polymer 320, and nano-rods 330. The LC layer 300 makes contact with each of the second electrode E2 and the third electrode E3. The LC molecules 310, the reactive mesogen polymer 320, and the nano-rods 330 make contact with the second electrode E2 and the third electrode E3.

Each of the LC molecules 310 includes a compound having at least one cyclic unit as a core. Examples of the cyclic unit may include benzene or cyclohexane, etc, and the core may include both benzene and the cyclohexane. For example, the core may have a biphenyl ring structure, a terphenyl ring structure, a phenyl-cyclohexyl ring structure, etc. A kind of the LC molecules may be divided to at least one type.

The LC molecules 310 have a positive dielectric anisotropy (Δε). A dielectric of a major axis ($ε_{//}$) of the LC molecules 310 is larger than a dielectric of a minor axis (ε⊥) of the LC molecules 310 so that the dielectric anisotropy (Δε) as a difference between the dielectric of the major axis ($ε_{//}$) and the dielectric of the minor axis (ε⊥) may have a positive value. The major axis of the LC molecules 310 having the positive dielectric anisotropy (Δε) is parallel with an electric field direction. Since the LC molecules 310 have the positive dielectric anisotropy (Δε), the display panel 500 may be driven to a white mode and a black mode according to a type of the electric field formed in the LC layer 300. A non-electric field state shown in FIG. 2, that is, when the horizontal electric field or the vertical electric field are not formed in the LC layer 300, the LC molecules 310 may be randomly arranged in the LC layer 300.

In the LC layer 300, since an amount of the LC molecules 310 is much larger than an amount of the reactive mesogen polymer 320 or the nano-rods 330, an entire dielectric anisotropy (Δε) of components included in the LC layer 300, that is, the entire dielectric anisotropy (Δε) of the LC molecules 310, the reactive mesogen polymer 320, and the nano-rods 330 may have a positive value.

Since the LC molecules 310 make contact with each of the second electrode E2 and the third electrode E3, the LC molecules 310 may receive more of the electric field effect of the second electrode E2 and/or the third electrode E3, compared to when the alignment layer is formed. Thus, a consumption power for driving and controlling the LC molecules 310 may be minimized. In addition, without the alignment layer, an alignment of the LC molecules 310 is supported by the reactive mesogen polymer 320 and the nano-rods 330 so that the white mode and the black mode may be stably driven.

When a total amount of the LC molecules 310, the reactive mesogen polymer 320, and the nano-rods 330 is defined as about "100% by weight," the reactive mesogen polymer 320 and the nano-rods 330 may maximally support the alignment of the LC molecules 310 when the LC molecules 310 are in a range which is greater than about 98% by weight and less than about 100% by weight, without the reactive mesogen polymer 320 and the nano-rods 330 interrupting a control of the LC molecules 310 by the electric field as impurities. For example, the total amount of the LC molecules 310 may be greater than or equal to about 99.4% by weight and less than about 100% by weight.

The reactive mesogen polymer 320 serves as a polymer formed by a polymerization of a reactive mesogen 322 (Refer to FIG. 7) and forms a network in the LC layer 300. The reactive mesogen polymer 320 may form a single network or a plurality of networks randomly disposed in the LC layer 300. When the LC molecules 310 are arranged by the electric field, for example, the horizontal electric field and the network of the reactive mesogen polymer 320, the reactive mesogen polymer 320 may support the alignment of the LC molecules 310 without the alignment layer. The reactive mesogen 322 may have a structure similar to a structure of the LC molecules 310 and include a photoreactive group as a terminal functional group. Examples of the photoreactive group may include acrylate, methacrylate, etc. When the photoreactive group is activated by light, the reactive mesogens 322 are polymerized to form the reactive mesogen polymer 320.

The reactive mesogen polymer 320 may be disposed in any region. For example, in the thickness direction of the LC layer 300 from the display substrate 100 to the opposite substrate 200, the mesogen polymer 320 density may be higher near the mid region of the LC layer 300 than near the interfaces of the LC layer 300 with the display substrate 100 and the opposite substrate 200, respectively. For example, the reactive mesogen polymer 320 may be mainly disposed inside the LC layer 300 far from the surface of the second electrode E2 or the third electrode E3, compared to the surface of the second electrode E2 or the third electrode E3 as a region adjacent to the display substrate 100 or the opposite substrate 200 at outside of the LC layer 300. A density of the reactive mesogen polymer 320 disposed adjacent to each of the second and third electrodes E2 and E3 may be less than that of the reactive mesogen polymer 320 disposed inside the LC layer 300. When the reactive mesogen polymer 320 is disposed adjacent to the second electrode E2, a voltage applied to the second electrode E2 is increased by the presence of the reactive mesogen polymer 320 compared to when the reactive mesogen polymer 320 is not disposed in the LC layer 300. However, the reactive mesogen polymer 320 is disposed inside the LC layer 300 according to exemplary embodiments of the present invention. Therefore, the voltage applied to the second electrode E2 when the LC layer 300 includes the reactive mesogen polymer 320 is little different from a voltage applied to the second electrode E2 when the LC layer 300 does not include the reactive mesogen polymer 320.

When an amount of the reactive mesogen polymer 320 is greater than about 0% by weight and less than or equal to about 1% by weight with respect to a total weight of the LC molecules 310, the reactive mesogen polymer 320, and the nano-rods 330, the reactive mesogen polymer 320 may support the alignment of the LC molecules 310, while not serving as impurities to interrupt light transmittance. The first and second phase compensating films may solve the problem of increasing the brightness in the black mode by the reactive mesogen polymer 320. For example, the amount of the reactive mesogen polymer 320 may be greater than about 0% by weight and less than equal to about 0.5% by weight.

When the LC molecules 310 are aligned by the electric field with the network of the reactive mesogen polymer 320, the nano-rods 330 may support the alignment of the LC molecules 310 without additional alignment layer. Each nano-rod 330 serves as a conductive subject having a rod shape extending in a direction and induces an electric field having an electric field direction similar to a main electric field direction in regions which field strength is weak or controlling the alignment is difficult, and thus the nano-rods 330 may support the alignment of the LC molecules 310. The nano-rods 330 may have an arrangement substantially the same as the network of the reactive mesogen polymer 320 and be disposed in the LC layer 300.

Examples of the nano-rods 330 may include carbon nano tube, hexadecyl trimethyl ammonium bromide ("HTAB"), etc. These may be used alone or as a mixture thereof. A kind of the nano-rods 330 is not limited to the above examples.

When a total amount of the nano-rods 330 is greater than about 0% by weight and less than or equal to about 1% by weight with respect to a total weight of the LC molecules 310, the reactive mesogen polymer 320, and the nano-rods 330, the nano-rods 330 may support the alignment of the LC molecules 310, while not serving as impurities to interrupt light transmittance in the LC layer 300. For example, the amount of the nano-rods 330 may be greater than about 0% by weight and less than or equal to about 0.1% by weight.

Hereinafter, the alignment of the LC molecules 310, when the horizontal electric field and the vertical electric field are formed in the LC layer 300 from the non-electric field state shown in FIG. 2, will be illustrated referring to FIG. 3.

Figure 3:
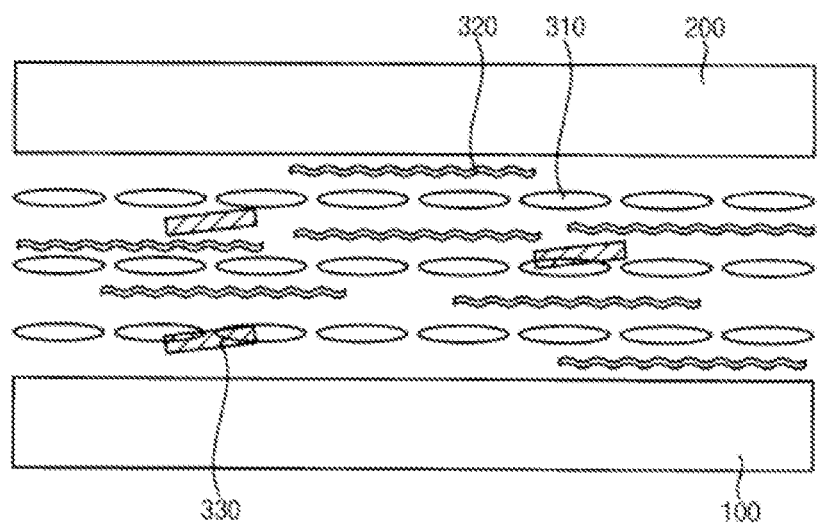
FIG. 3 is a cross-sectional view when a horizontal electric field is formed in a liquid crystal layer of the display panel in FIG. 2.

FIG. 3 is a cross-sectional view when a horizontal electric field is formed in a liquid crystal layer of the display panel in FIG. 2.

Referring to FIG. 3, when the first electrode E1 and the second electrode E2 receive voltages different from each other to form the horizontal electric field in the LC layer 300, a major axis of the LC molecules 310 having the positive dielectric anisotropy is parallel to a direction of the horizontal electric field. Here, the reactive mesogen polymer 320 and the nano-rods 330 support the alignment of the LC molecules 310. For example, the reactive mesogen polymer 320 and the nano-rods 330 are affected by the horizontal electric field to be disposed with having directivity, and the directivity of the reactive mesogen polymer 320 and the nano-rods 330 supports the alignment of the LC molecules 310.

The major axis of the LC molecules 310 is parallel to each surface of the display substrate 100 and the opposite substrate 200 so that light provided from the back of the display substrate 100 is provided to the opposite substrate 200 through the LC layer 300. When the horizontal electric field is formed in the LC layer 300, the display panel 500 is the white mode displaying white image.

Since the LC molecules 310 are affected by the horizontal electric field without the alignment layer, a response speed when the alignment layer is not included is faster than that when the alignment layer is included in the display panel 500. The LC molecules 310 may be changed from a random state in FIG. 2 to an alignment state in FIG. 3 at a speed of about 1 ms to about 2 ms.

In the white mode, although the horizontal electric field and the vertical electric field are not simultaneously formed in the LC layer 300, the reactive mesogen polymer 320 and/or the nano-rods 330 support the alignment of the LC molecules 310 to minimize decreasing the light-transmittance without the alignment layer.

When the vertical electric field is formed in the LC layer 300 of the display panel 500 in FIG. 2, a potential difference between the first and second electrodes E1 and E2 is about 0V. Voltages applied to the third electrode E3 and one of the first and second electrodes E1 and E2 are different from each other to form the vertical electric field in the LC layer 300. Here, the major axis of the LC molecules 310 is arranged toward a direction from the display substrate 100 to the opposite substrate 200. The major axis of the LC molecules 310 is arranged parallel to the electric field direction so that the LC molecules 310 vertically stand with respect to the surface of the display substrate 100. Here, the display panel 500 may be the black mode displaying the black image.

An assistance effect of the reactive mesogen polymer 320 and the nano-rods 330 may be less effective to the alignment of the LC molecules 310 by the vertical electric field, compared to the horizontal electric field. A view angle in the black mode may be more compensated from the first and second phase compensating films than the reactive mesogen polymer 320 and the nano-rods 330.

The LC molecules 310 are directly affected by the vertical electric field without the alignment layer so that a response speed when the alignment layer is not included is faster than that when the alignment layer is included in the display panel 500. The LC molecules 310 may be changed from the alignment state in FIG. 3 to a black mode state at a speed of about 0.1 ms to about 0.5 ms.

Although not shown in the figures, an image converting part is disposed on the opposite substrate 200 of the display substrate 500 in FIG. 1 and FIG. 2 so that the display panel 500 may be used for a stereoscopic image display device. The image converting part may change a 2-dimensional image displayed by the display panel 500 to a 3-dimensional image. For example, the image converting part may include a lenticular lens part reflecting light. The stereoscopic image display device including the display panel 500 has fast response speed so that a viewer may see an image having good quality without an afterimage.

Hereinafter, an effect of exemplary embodiments of the present invention will be illustrated in detail, through Panel Samples according to exemplary embodiments of the present invention and Comparative Samples. The following samples are merely illustrative and should not be construed as in any way limiting the scope of the present invention.

Preparation of Panel Samples 1 and 2, Comparative Samples 1 and 2

A first substrate and a second substrate substantially the same as the display substrate and the opposite substrate in FIG. 1 and FIG. 2 were prepared, and an LC layer including about 99.4% by weight of LC molecules 238 LC (product name) of Merck (Corporation, Germany) having a positive dielectric anisotropy, about 0.5% by weight of a reactive mesogen polymer formed from RM-491 (product name) of Merck and about 0.1% by weight of hexadecyl trimethyl ammonium bromide ("HTAB") was formed between the first and second substrates to obtain Panel Sample 1.

Panel Sample 2 was prepared by substantially the same method as Panel Sample 1, except for an LC layer. The LC layer of Panel Sample 2 included about 98.9% by weight of 238 LC, about 1.0% by weight of RM-491, and about 0.1% by weight of HTAB.

In addition, Comparative Sample 1 was prepared by substantially the same method as Panel Sample 1 except for an LC layer. The LC layer of Comparative Sample 1 included about 97.9% by weight of 238 LC, about 2% by weight of RM-491 and about 0.1% by weight of HTAB.

Comparative Sample 2 was prepared by substantially the same method as Panel Sample 1 except for an LC layer. The LC layer of Comparative Sample 2 included about 95.9% by weight of 238 LC, about 4.0% by weight of RM-491 and about 0.1% by weight of HTAB.

Evaluation 1—Brightness Evaluation of Black Mode

Comparative Sample 3 including a first substrate, on which an alignment layer is formed, being substantially the same as the display substrate in FIG. 1 and FIG. 2, a second substrate substantially the same as the opposite substrate in FIG. 2 except for omitting the third electrode, and an LC layer including 238 LC was prepared and a brightness of Comparative Sample 3 in a non-electric field state was measured. In addition, brightness of Panel Samples 1 and 2 and Comparative Samples 1 and 2 was measured in a black mode forming a vertical electric field, and was compared to the brightness of Comparative Sample 3. As a result, when the brightness of Comparative Sample 3 defines about "100%," a relative brightness of each of Panel Samples 1 and 2 and Comparative Samples 1 and 2 was about 112%, about 152%, about 480% and about 1,960%, respectively.

Referring to the result, the brightness of Panel Samples 1 and 2 not including the alignment layer is similar to that of Comparative Sample 3 including the alignment layer in the black mode. In contrast, the brightness of Comparative Samples 1 and 2 in the black mode was too great. Therefore, the amount of the reactive mesogen polymer may be less than or equal to about 1% by weight considering brightness in the black mode, for example, less than or equal to about 0.5% by weight.

Preparation of Panel Samples 3 to 5

A first substrate and a second substrate substantially the same as the display substrate and the opposite substrate in FIG. 1 and FIG. 2 were prepared, and an LC layer including about 99.4% by weight of 238 LC (product name) of Merck (Corporation, Germany) having a positive dielectric anisotropy, about 0.5% by weight of a reactive mesogen polymer formed from RM-491 (product name) of Merck and about 0.1% by weight of carbon nano-tube was formed between the first and second substrates to obtain Panel Sample 3.

Panel Sample 4 was prepared by substantially the same method as Panel Sample 1, except for an LC layer. The LC layer of Panel Sample 4 included about 97.5% by weight of 238 LC, about 0.5% by weight of RM-491, and about 2.0% by weight of HTAB.

In addition, Panel Sample 5 was prepared by substantially the same method as Panel Sample 1, except for an LC layer. The LC layer of Panel Sample 5 included about 97.5% by weight of 238 LC, about 0.5% by weight of RM-491, and about 2.0% by weight of carbon nano-tube.

Evaluation 2—Light Transmittance Evaluation

Figure 4:
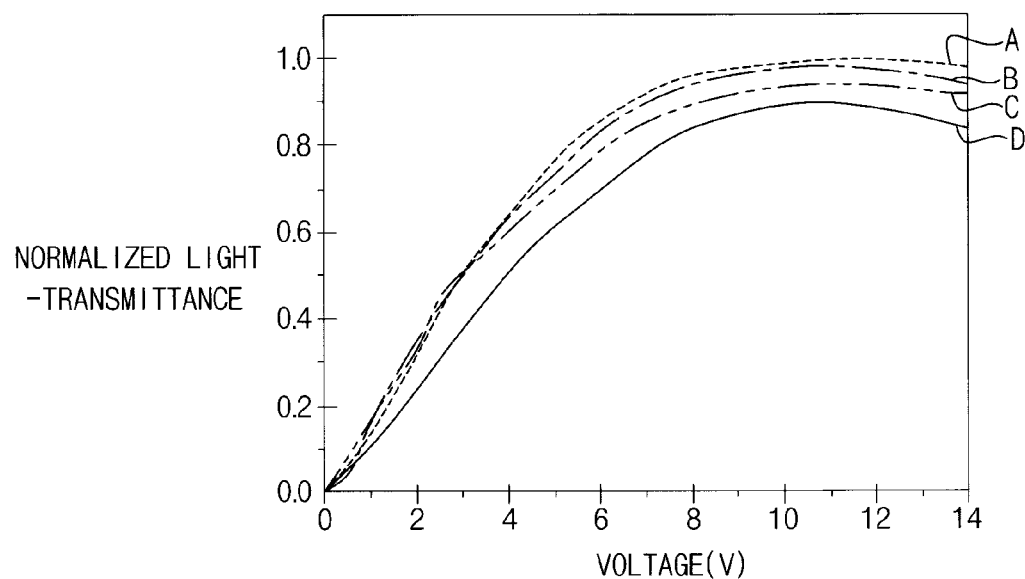
FIG. 4 is a graph illustrating a light-transmittance according to a voltage when an amount of a nano-rod in the liquid crystal layer is about 0.1% by weight and about 2.0% by weight.

In order to form a horizontal electric field, a light transmittance was measured when a potential difference between the first and second electrodes was changed from about 0V to about 14V for each of Panel Samples 1, 3, 4 and 5, and thus the results obtained are shown in FIG. 4.

FIG. 4 is a graph illustrating a light-transmittance according to a voltage when an amount of a nano-rod in the liquid crystal layer is about 0.1% by weight and about 2.0% by weight. In FIG. 4, graph "A" represents a light-transmittance of Panel Sample 1, graph "B" represents a light-transmittance of Panel Sample 3, graph "C" represents a light-transmittance of Panel Sample 4 and graph "D" represents a light-transmittance of Panel Sample 5. Each of graphs B, C and D is a normalized graph for the graph A. In FIG. 4, the "x" axis represents a voltage (potential difference, unit: Volt) between the first and second electrodes and the "y" axis represents a normalized transmittance (no unit).

Referring to FIG. 4, when an amount of the nano-rods is about 0.1% by weight, regardless of a kind of the nano-rods, the transmittance characteristic is increased according to the voltage. In contrast, when the amount of the nano-rods is about 2.0% by weight, the transmittance is lower than the transmittance when the amount of the nano-rods is about 0.1% by weight. Therefore, the amount of the nano-rods may be less than about 2.0% by weight, for example, less than or equal to about 1.0% by weight. As a further example, the amount of the nano-rods may be less than or equal to about 0.1% by weight.

Preparation of Comparative Samples 4, 5 and 6

238 LC (product name) of Merck (Corporation, Germany) was interposed between a first substrate on which a pixel electrode and a first alignment layer were formed and a second substrate on which a second alignment layer was formed to prepare Comparative Sample 4.

Comparative Sample 5 was prepared by substantially the same method as Panel Sample 1, except for an LC layer and an alignment layer. Comparative Sample 5 did not include the alignment layer. The LC layer of Comparative Sample 5 included about 100% by weight of 238 LC.

Comparative Sample 6 was prepared by substantially the same method as Comparative Sample 1, except for an LC layer. The LC layer of Comparative Sample 6 included about 99.5% by weight of 238 LC and about 0.5% by weight of RM-491 (product name) of Merck.

Evaluation 3—Light Transmittance Evaluation

A light transmittance was measured when a potential difference between the first and second electrode was changed from about 0V to about 14V for each of Panel Samples 1 and 3 and Comparative Samples 5 and 6. A light transmittance was measured when a potential difference between the pixel electrode and the common electrode was changed from about 0V to about 14V for Comparative Sample 4. Thus, the results obtained are shown in FIG. 5.

In addition, a response speed was measured for Panel Samples 1 and 3 and Comparative Samples 4, 5 and 6.

Figure 5:
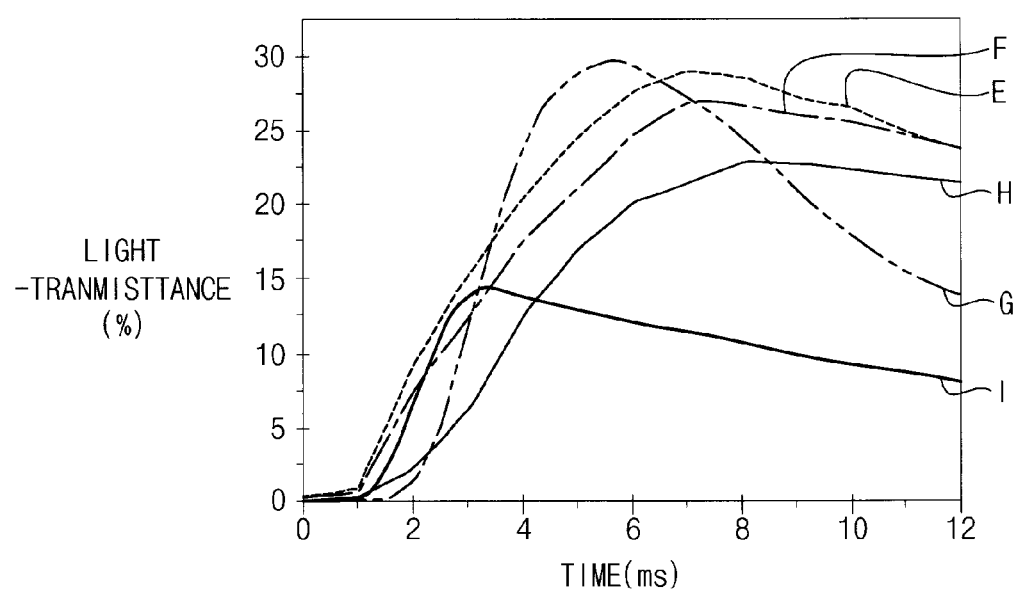
FIG. 5 is a graph illustrating a light-transmittance according to a time for Panel Samples 1 and 3, and Comparative Samples 4, 5 and 6.

FIG. 5 is a graph illustrating a light-transmittance according to a time for Panel Samples 1 and 3, Comparative Samples 4, 5 and 6. In FIG. 5, a graph "E" represents a light-transmittance of Panel Sample 1, a graph "F" represents a light-transmittance of Panel Sample 3, a graph "G" represents a light-transmittance of Comparative Sample 6, a graph "H" represents a light-transmittance of Comparative Sample 4, and a graph "I" represents a light-transmittance of Comparative Sample 5. In FIG. 5, an "x" axis represents a time (unit: ms) and a "y" axis represents a light transmittance (unit: %).

Referring to FIG. 5, the light-transmittance of Panel Samples 1 and 3 is similar to that of Comparative Sample 4 and remarkably superior to Comparative Samples 5 and 6. In the response speed, the response speed of Panel Samples 1 and 3 is faster than that of Comparative Sample 1 by more than about 10%. Referring to the results of Panel Samples 1 and 3, LC molecules are interposed between electrodes, not the alignment layer having high anchoring energy, so that the response speed of the LC molecules may be improved.

Hereinafter, an exemplary embodiment of a method of manufacturing the display panel 500 in FIG. 1 and FIG. 2 will be illustrated in detail referring to FIG. 6, FIG. 7, and FIG. 8.

Figure 6:
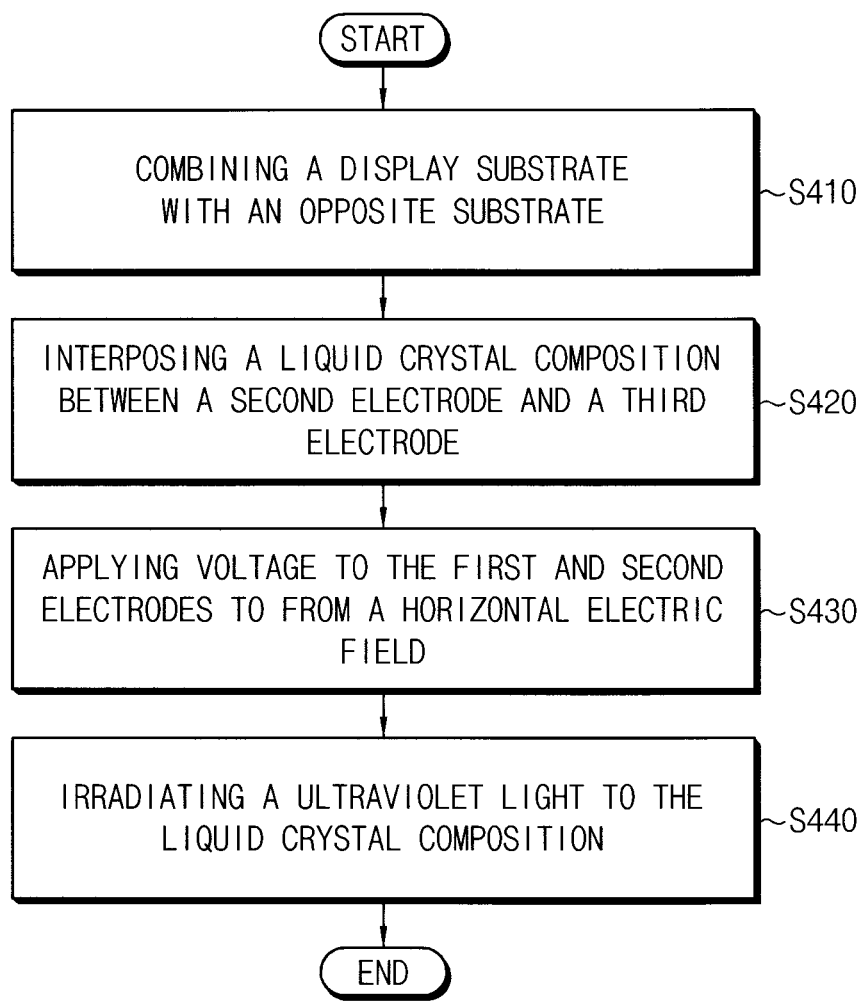
FIG. 6 is a flow chart illustrating a method of manufacturing the display panel of FIG. 2.

FIG. 6 is a flow chart illustrating an exemplary embodiment of a method of manufacturing the display panel in FIG. 2.

Referring to FIG. 6, the display substrate 100 including the first and second electrodes E1 and E2 is combined with the opposite substrate 200 including the third electrode E3 (Step S410). Here, the second electrode E2 faces the third electrode E3.

Then, the LC composition is interposed between the second electrode E2 and the third electrode E3 (Step S420). The LC composition is substantially interposed between the display substrate 100 and the opposite substrate 200, and each of the display substrate 100 and the opposite substrate 200 does not include the alignment layer so that the LC composition makes contact with the second and third electrodes E2 and E3.

Although FIG. 6 shows interposing the LC composition between the display substrate 100 and the opposite substrate 200 after combining the display substrate 100 and the opposite substrate 200, the LC composition may be dropped on one of the display substrate 100 or the opposite substrate 200, and then the other substrate may be combined with the one substrate to interpose the LC composition between the display substrate 100 and the opposite substrate 200.

The LC composition includes the LC molecules 310, the nano-rods 330 and the reactive mesogens 322. The reactive mesogens 322 are monomers forming the reactive mesogen polymer 320. The LC molecules 310 and the nano-rods 330 are substantially the same as the LC molecules 310 and the nano-rods 330 of the LC layer 300 illustrated above, and thus any repetitive descriptions will be omitted. The reactive mesogens 322 are illustrated above with the reactive mesogen polymer 320, and thus hereinafter the description for the reactive mesogens 322 will be omitted.

The LC composition may include greater than or equal to about 98% by weight and less than about 100% by weight of the LC molecules 310, greater than about 0% by weight and less than about 1% by weight of the reactive mesogens 322 and greater than about 0% by weight and less than about 1% by weight of the nano-rods 330, with respect to the total weight of the LC composition. The LC composition may be randomly disposed between the display substrate 100 and the opposite substrate 200 without directivity.

Voltages are applied to the second electrode E2 and the third electrode E3 to form the horizontal electric field (Step S430). By the horizontal electric field, the LC molecules 310 are arranged parallel to the electric field direction of the horizontal electric field.

At a state forming the horizontal electric field, the ultraviolet light is irradiated to the LC composition from one of the display substrate 100 and the opposite substrate 200 (Step S440).

Figure 7:
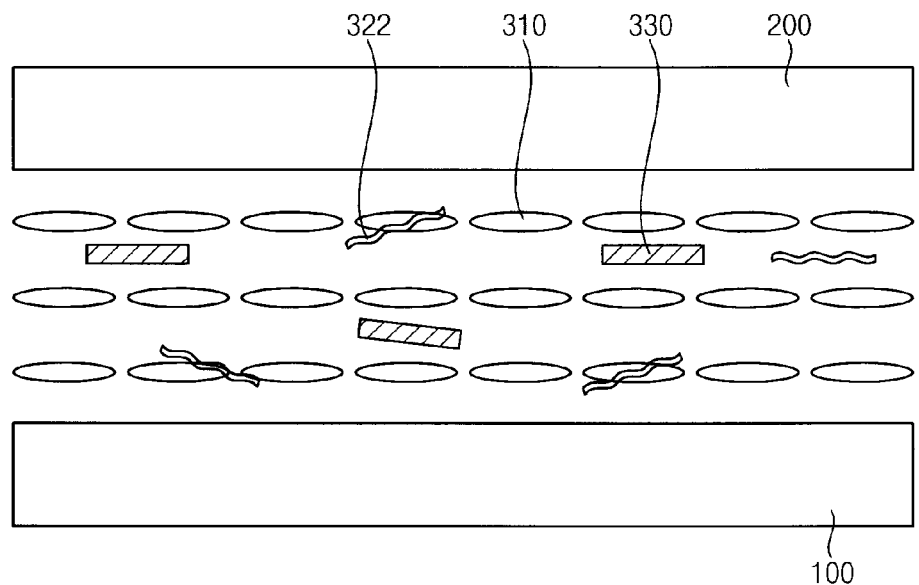
FIG. 7 is a cross-sectional view illustrating a step of irradiating an ultraviolet light in an electric field state in FIG. 6.

FIG. 7 is a cross-sectional view illustrating a step of irradiating an ultraviolet light in an electric field state in FIG. 6.

Referring to FIG. 7 with FIG. 3 and FIG. 6, when the horizontal electric field is formed, the LC molecules 310 are parallel to an electric field direction of the horizontal electric field. In addition, the reactive mesogen polymer 320 and the nano-rods 330 are disposed between the LC molecules 310. Before irradiating the ultraviolet light, the reactive mesogens 322 as an independent monomer are disposed between the LC molecules 310. Since the reactive mesogens 322 are mostly polymerized by the ultraviolet light irradiation, an amount of the reactive mesogens 322 may be substantially the same as the amount of the reactive mesogen polymer 320 with respect to a total weight of a composition in the LC 300.

When the ultraviolet light is irradiated in the horizontal electric field state, the reactive mesogens 322 are polymerized to form the reactive mesogen polymer 320.

Figure 8:
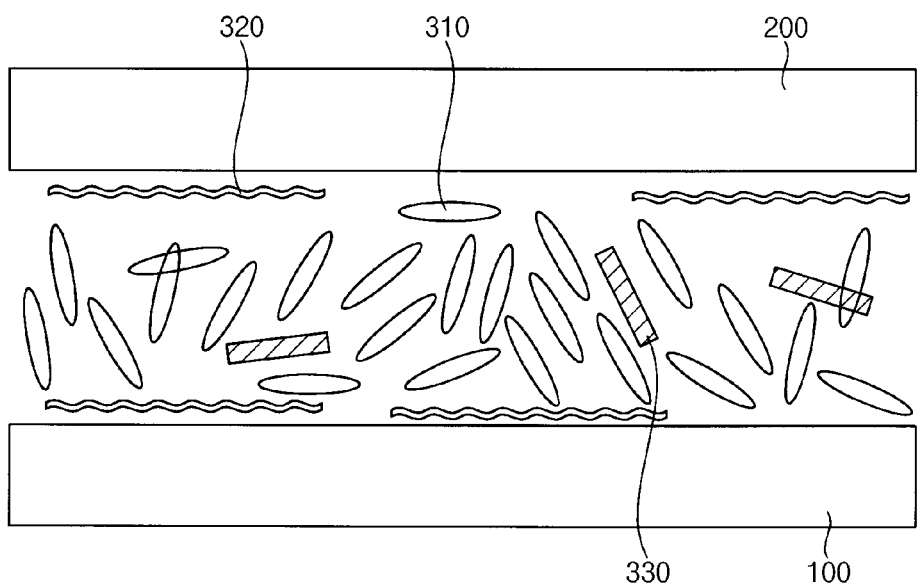
FIG. 8 is a cross-sectional view illustrating the liquid crystal layer of a non-electric field state after irradiating the ultraviolet light in FIG. 6.

FIG. 8 is a cross-sectional view illustrating the liquid crystal layer of a non-electric field state after irradiating the ultraviolet light in FIG. 6.

Referring to FIG. 8 with FIG. 6, when the horizontal electric field is removed to be the non-electric field state after forming the reactive mesogen polymer 320, the LC molecules 310 are randomly disposed between the display substrate 100 and the opposite substrate 200. That is, the LC layer 300 of the non-electric field after irradiating the ultraviolet light is substantially the same sate as the LC layer 300 illustrated in FIG. 2.

When the non-electric field state is changed to the horizontal electric field state, the display panel 500 displays the white image. Alternatively, when the non-electric field state is changed to the vertical electric field state, the display panel 500 displays the black image.

According to the above descriptions, the LC layer 300 includes the reactive mesogen polymer 320 and the nano-rods 330 so that the LC molecules 310 may be easily controlled without the alignment layer. In particular, the black mode and the white mode of the display panel 500 are merely driven by the horizontal electric field and the vertical electric field. Thus, the display panel 500 does not include the alignment layer so that a delay of moving the LC molecules 310 from the alignment layer may be prevented, thereby improving the light-transmittance and the response speed of the display panel 500.

According to exemplary embodiments of the present invention, a liquid crystal layer including a reactive mesogen polymer, a nano-rod, and a positive liquid crystal composition is used so that liquid crystal molecules may be supported by the reactive mesogen polymer and the nano-rod. Thus, without including an alignment layer, the liquid crystal molecules may be easily controlled using a vertical electric field and a horizontal electric field. The liquid crystal layer is interposed between electrodes facing each other, not the alignment layers having high anchoring energy, to improve the response speed of the liquid crystal molecules.

In addition, although the vertical electric field and the horizontal electric field are not simultaneously formed in the liquid crystal layer, the reactive mesogen polymer and/or the nano-rod may support the alignment of the liquid crystal molecules without the alignment layers so as to minimize decreasing a light-transmittance.

The foregoing is illustrative of the present invention and is not to be construed as limiting thereof. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal composition, comprising:
   liquid crystal molecules;
   a reactive mesogen polymer; and
   nano-rods,
   wherein a total weight of the nano-rods is greater than 0% by weight and less than or equal to about 1% by weight with respect to a total weight of the liquid crystal molecules, the reactive mesogen polymer, and the nano-rods.

2. The liquid crystal composition of claim 1, wherein the liquid crystal molecules comprise a positive dielectric anisotropy ($\Delta\in$).

3. The liquid crystal composition of claim 1, wherein an amount of the reactive mesogen polymer is greater than 0% by weight and less than or equal to about 1% by weight with respect to a total weight of the liquid crystal molecules, the reactive mesogen polymer, and the nano-rods.

4. The liquid crystal composition of claim 1, wherein the nano-rods comprise at least one selected from the group consisting of hexadecyl trimethyl ammonium bromide ("HTAB") and a carbon nano tube.

5. The liquid crystal composition of claim 1, wherein a density of the reactive mesogen polymer disposed inside the liquid crystal layer is greater than that of the reactive mesogen polymer disposed near surfaces of the liquid crystal layer.

6. A display panel, comprising:
- a display substrate comprising a first electrode and a second electrode insulated from the first electrode and disposed on the first electrode;
- an opposite substrate comprising a third electrode facing the second electrode; and
- a liquid crystal layer interposed between the display substrate and the opposite substrate, the liquid crystal layer comprising liquid crystal molecules, a reactive mesogen polymer, and nano-rods,
- wherein a total weight of the nano-rods is greater than 0% by weight and less than or equal to about 1% by weight with respect to a total weight of the liquid crystal molecules, the reactive mesogen polymer, and the nano-rods.

7. The display panel of claim 6, wherein the liquid crystal molecules comprise a positive dielectric anisotropy ($\Delta\epsilon$).

8. The display panel of claim 6, wherein an amount of the reactive mesogen polymer is greater than 0% by weight and less than or equal to about 1% by weight with respect to a total weight of the liquid crystal molecules, the reactive mesogen polymer, and the nano-rods.

9. The display panel of claim 6, wherein the nano-rods comprise at least one selected from the group consisting of hexadecyl trimethyl ammonium bromide ("HTAB") and a carbon nano tube.

10. The display panel of claim 6, wherein a density of the reactive mesogen polymer disposed inside the liquid crystal layer is greater than that of the reactive mesogen polymer disposed near the surfaces of the liquid crystal layer adjacent to each of the second and third electrodes.

11. The display panel of claim 6, wherein the liquid crystal layer makes contact with each of the second electrode and the third electrode.

12. The display panel of claim 6, wherein the second electrode comprises a plurality of sub electrodes and the first electrode overlaps with the sub electrodes and is disposed in a region between the sub electrodes,
- wherein the display substrate further comprises a switching element connected to one of the first electrode and the second electrode and is connected to signal lines.

13. The display panel of claim 6, wherein, when the first and second electrodes receive voltages different from each other to form a horizontal electric field, a major axis of the liquid crystal molecules is parallel with a direction of the horizontal electric field to display white,
- wherein when the third electrode and one of the first and second electrodes receive different voltages from each other to form a vertical electric field, the major axis of the liquid crystal molecules is parallel with a direction of the vertical electric field to display black.

14. A method of manufacturing a display panel, the method comprising:
- combining a display substrate comprising a first electrode and a second electrode insulated from and disposed on the first electrode with an opposite substrate comprising a third electrode to face the display substrate;
- forming an electric field in a liquid crystal composition interposed between the display substrate and the opposite substrate, the liquid crystal composition comprising liquid crystal molecules, reactive mesogens, and nano-rods; and
- irradiating an ultraviolet light to the liquid crystal composition when the electric field is formed, to form a reactive mesogen polymer,
- wherein a total amount of the nano-rods is greater than 0% by weight and less than or equal to about 1% by weight with respect to a total weight of the liquid crystal molecules, the reactive mesogens, and the nano-rods.

15. The method of claim 14, wherein forming the electric field comprises:
- establishing a potential difference between the first and second electrodes to form a horizontal electric field.

16. The method of claim 15, wherein the ultraviolet light is irradiated through one of the display substrate and the opposite substrate when the potential difference between the first and second electrodes is established so that a major axis of the liquid crystal molecules is parallel with a direction of the horizontal electric field.

17. The method of claim 14, wherein the liquid crystal molecules comprise a positive dielectric anisotropy ($\Delta\epsilon$).

18. The method of claim 14, wherein a total amount of the reactive mesogens is greater than 0% by weight and less than or equal to about 1% by weight with respect to a total weight of the liquid crystal molecules, the reactive mesogens, and the nano-rods.

19. The method of claim 14, wherein the liquid crystal composition makes contact with the second and third electrodes.

* * * * *